United States Patent [19]
Kosho

[11] Patent Number: 6,139,028
[45] Date of Patent: Oct. 31, 2000

[54] ELECTRIC CHUCK FOR MACHINE TOOL AND METHOD OF OPENING OR CLOSING GRIPPING PAWL OF SAME

[75] Inventor: Akira Kosho, Chiba, Japan

[73] Assignee: Hitachi Seiki Co., Ltd., Chiba, Japan

[21] Appl. No.: 09/147,157

[22] PCT Filed: Feb. 18, 1998

[86] PCT No.: PCT/JP98/00673

§ 371 Date: Oct. 20, 1998

§ 102(e) Date: Oct. 20, 1998

[87] PCT Pub. No.: WO98/36863

PCT Pub. Date: Aug. 27, 1998

[30] Foreign Application Priority Data

Feb. 21, 1997 [JP] Japan ................................. 9-053928

[51] Int. Cl.[7] .................... B23B 31/163; B23B 31/26; B23Q 5/20
[52] U.S. Cl. .................... 279/114; 279/111; 279/126; 279/150; 82/142
[58] Field of Search ..................... 279/111, 114, 279/126, 134, 135, 110, 115, 116, 150; 82/142

[56] References Cited

U.S. PATENT DOCUMENTS

| | | | |
|---|---|---|---|
| 1,512,078 | 10/1924 | Beck | 279/110 |
| 2,575,662 | 11/1951 | Highberg | 279/114 |
| 3,458,209 | 7/1969 | Scholz | 279/134 |
| 3,936,060 | 2/1976 | Hirao | 279/110 |
| 4,133,230 | 1/1979 | Inaba et al. | 82/142 |
| 4,482,163 | 11/1984 | Depweg | 279/126 |
| 4,758,006 | 7/1988 | Hiestand | |
| 5,167,175 | 12/1992 | Rohm | 279/110 |

FOREIGN PATENT DOCUMENTS

| | | |
|---|---|---|
| 45-12556 | 6/1970 | Japan . |
| 1-289608 | 11/1989 | Japan . |
| 3-117505 | 5/1991 | Japan . |
| 4-9207 | 1/1992 | Japan . |
| 5-24209 | 3/1993 | Japan . |
| 5-185310 | 7/1993 | Japan . |
| 8-19903 | 1/1996 | Japan . |
| 722696 | 3/1980 | U.S.S.R. ............... 279/114 |

Primary Examiner—Steven C. Bishop
Attorney, Agent, or Firm—Armstrong, Westerman, Hattori, McLeland & Naughton

[57] ABSTRACT

The present invention relates to an electrically driven chuck for holding a chuck of a machine tool, wherein an electrically driven chuck which has no need of any driving means to be exclusively used for a holding chuck, very simplified, and freely adjustable.

Chuck fixing means 40 is locking means for locking a chuck body on a headstock 1. Position-deciding pin driving means 42 includes position-deciding part 43 which has piston 44. The insertion of position-deciding part 43 is inserted into position-deciding hole 41 when pressured air is supplied within cylinder 46. When built-in motor 4 is rotatively driven, both main spindle 2 and scroll 17 are rotatively driven, and jaws 30 move to hold or un-hold a work in the radial direction.

9 Claims, 9 Drawing Sheets

(a)

(b)

ELECTRIC CHUCK FOR MACHINE TOOL AND METHOD OF OPENING OR CLOSING GRIPPING PAWL OF SAME

FIELD OF THE INVENTION

The present invention relates to a holding chuck of a machine tool or a method for driving chucking jaws thereof. The present invention particularly relates to an electrically driven chuck for a machine tool or a method for driving the chucking jaws thereof, wherein the chucking jaws of the holding chuck are electrically driven by an electric motor which drives the main spindle thereof.

PRIOR ARTS

A chuck for holding a work is mounted on the end portion of the main spindle of a lathe. Recently, the chucking jaws are not manually moved but driven by a driving means.

A hydraulic cylinder or an electric motor is used as such a driving means. An exclusive hydraulic cylinder or an exclusive electric motor is necessary in order for the chucking jaws to be driven.

The addition of such an exclusive means to a machine tool makes its chucking mechanism complex, and brings about higher costs thereof. The inventor of Japanese Patent Disclosure No. Heisei 8-150531, who is identical with the inventor of the present invention, disclosed in that patent an electrically driven chuck wherein no exclusive driving means for driving the chuck is necessary, the commonly used driving means being the electric motor for driving a main spindle.

Such an electrically driven chuck has no driving means, but it has a complex mechanism which includes a ring-like gear located at the circumferential position of the chuck body, the shifting mechanism for changing transmitting channels.

SUMMARY OF THE INVENTION

The present invention has been made with the above-described technical background, and it aims at attaining the following objects.

It is an object of the present invention to provide an electrically driven chuck of a machine tool, and a method for driving chucking jaws thereof which has no need of any driving means to be exclusively used for a holding chuck for holding such as a work.

It is another object of the present invention to provide an electrically driven chuck of a machine tool, and a method for driving chucking jaws thereof, the mechanical system of which is very simplified.

It is still another object of the present invention to provide an electrically driven chuck of a machine tool, and a method for driving chucking jaws thereof, wherein it is very easy to control the opening and closing of a set of chucking jaws.

It is a further object of the present invention to provide an electrically driven chuck of a machine tool, and a method for driving chucking jaws thereof, wherein the force of chucking a work is freely adjustable by corresponding it to the contents of the machining, such as rough machining or finishing machining, and the materials or shape of a work.

The advantage of an electrically driven chuck of a machine tool according to the present invention, which has no exclusive driving means for opening and closing a set of jaws, is that it is not necessary to consider any of the problems with respect to the heat that would be generated by the exclusive driving means, and has a further advantage that a work is held by a voluntary force obtained by a manual key-inputting operation, or by an assigned force designated by an NC-machining program.

DISCLOSURE OF THE INVENTION

A first electrically driven chuck of a machine tool comprises

- a main spindle motor for rotatively driving a main spindle, said main spindle being rotatively supported on a headstock,
- a chuck for opening or closing a set of holding members to hold a chucked body, said chuck being mounted on said main spindle,
- a transmitting channel changing means for changing channels, the one channel of said channels transmitting the rotation of said main spindle to the motion of opening or closing of said holding members, the other channel of said channels transmitting said rotation of said main spindle to the rotations of said main spindle and said chuck as one body, said transmitting channel changing means being located between a body of said machine tool and said chuck, wherein said chuck is relatively fixed with a body of said machine tool, and
- a motion transforming means for transforming said rotation of said main spindle to said motion of said opening or said closing of said holding members, when said one channel is selected by said transmitting channel changing means, said motion transforming means being mounted on said chuck.

The machine tool body generally includes a non-movable body such as a headstock which has a main spindle for rotating a work, a spindle head which has a main spindle for rotating a working tool, or a bed which is identical with a support forming a main machine tool body. The machine tool body may be a body by which a chuck is relatively fixed therewith. The transmitting channel changing means for changing channels effectively operates when the chuck is fixed not to rotate. It is desirable that the transmitting channel changing means has a position-deciding pin which engages into an engaging hole which is formed within a chuck body which is the main body of a chuck, wherein the position-deciding pin is preferably driven by a driving means such as a hydraulic cylinder means or a screw screwing means. The driving means is provided with the machine tool body, such as the headstock or the bed.

The motion transforming means for transforming the rotation of the main spindle to the motion of the opening or the closing of the holding jaws is generally integrated into a scroll chuck. A scroll chuck particularly includes a helically formed scroll groove which is helically formed on the surface vertical to the axis of a main spindle, a chuck body which is rotatively supported on the peripheral portion of the scroll, and scroll teeth which are formed on the holding jaws, and engaged with the scroll grove.

Further, the second electrically driven chuck of a machine tool comprises

- a main spindle motor for rotatively driving a main spindle, said main spindle being rotatively supported on a headstock,
- a chuck for opening or closing a set of holding members to hold a chucked body, said chuck being mounted on said main spindle,
- a chuck fixing means for fixing said chuck not to rotate, said chuck fixing means being freely and fixedly mounted on a body of said machine tool, and a motion transforming means for transforming said rotation of said main spindle to said motion of said opening or said closing of said holding members, when said main spindle is fixed with said machine tool body by said chuck fixing means, said motion transforming means being mounted on said chuck.

The chuck fixing means may have the same mechanism as that of the transmitting channel changing means. The motion transforming means may have the same mechanism as described. The above defined electrically driven chucks preferably further comprise locking means for locking the operation of the motion transforming means for holding members not to move. Such defined chucks still effectively further comprise a strengthening means for strengthening the torque of the main spindle which is transmitted to the holding members. The strengthening means may be mounted on the motion transforming means.

The locking means preferably includes fixed teeth which are formed on the main spindle, inserting teeth which are mounted on the chuck body of the chuck, and engage with the fixed teeth and disengage with the fixed teeth, and an inserting teeth driving means for disengaging said inserting teeth from the fixed teeth when the chuck is stopped at the position of rotation thereof by the chuck fixing means. There may be provided an on-off operating clutch for preventing the relative motion between the main spindle and the chuck body.

Such an on-off operating clutch preferably includes annular moving clutch teeth, and fixed clutch teeth which engage with and disengages from the moving clutch teeth. The moving clutch teeth may be driven by a hydraulic cylinder driving means, wherein a hydraulic connector is used for applying the pressured hydraulic fluid for the cylinder driving means from outside of the chuck. A mechanism wherein the chuck fixing means is provided with a fluid applying path is formed to be effectively simple in the construction.

The strengthening mechanism may have a velocity-reducing gears mechanism, such as a planet gear mechanism or a differential gears mechanism. The planet gear mechanism has a sun gear which is fixedly mounted on the main spindle, an inner gear which is formed on the chuck body, and a planet gear which is rotatively mounted on the scroll, and simultaneously engages with both the sun gear and the inner gear. The above described main spindle motor being the built-in-motor, the rotor of which is fixed with the main spindle, and the stator of which is fixed with the headstock, is formed to be compact and simple in structure or construction. The main spindle motor may be preferably a motor for controlling the position of the respective holding jaws.

The above described first electrically driven chuck of a machine tool is effectively operated by a set of steps: fixing the chuck body with the machine tool body by the chuck fixing means (or stopping the main spindle with the transmitting channel changing means), rotating the main spindle by the main spindle motor, and moving the holding members into their respective directions, in which the holding members are moved to be opened or closed by the motion transforming means.

The main spindle is easily controlled to be position-determined and stopped at the predetermined position by the main spindle orientation function which is regularly given as an NC-function. Further, the output torque of the main spindle while the chucked body is held is more largely set than the torque while machining the chucked body is machined.

BRIEF DESCRIPTION OF THE DRAWINGS

FIG. 4($b$) is a view of FIG. 4($a$) on the A—A sectioning line thereof.

FIG. 7($b$) is a view of FIG. 7($a$) on the B—B sectioning line thereof.

PREFERABLE EMBODIMENTS OF THE INVENTION

Embodiment 1

Figure 1:
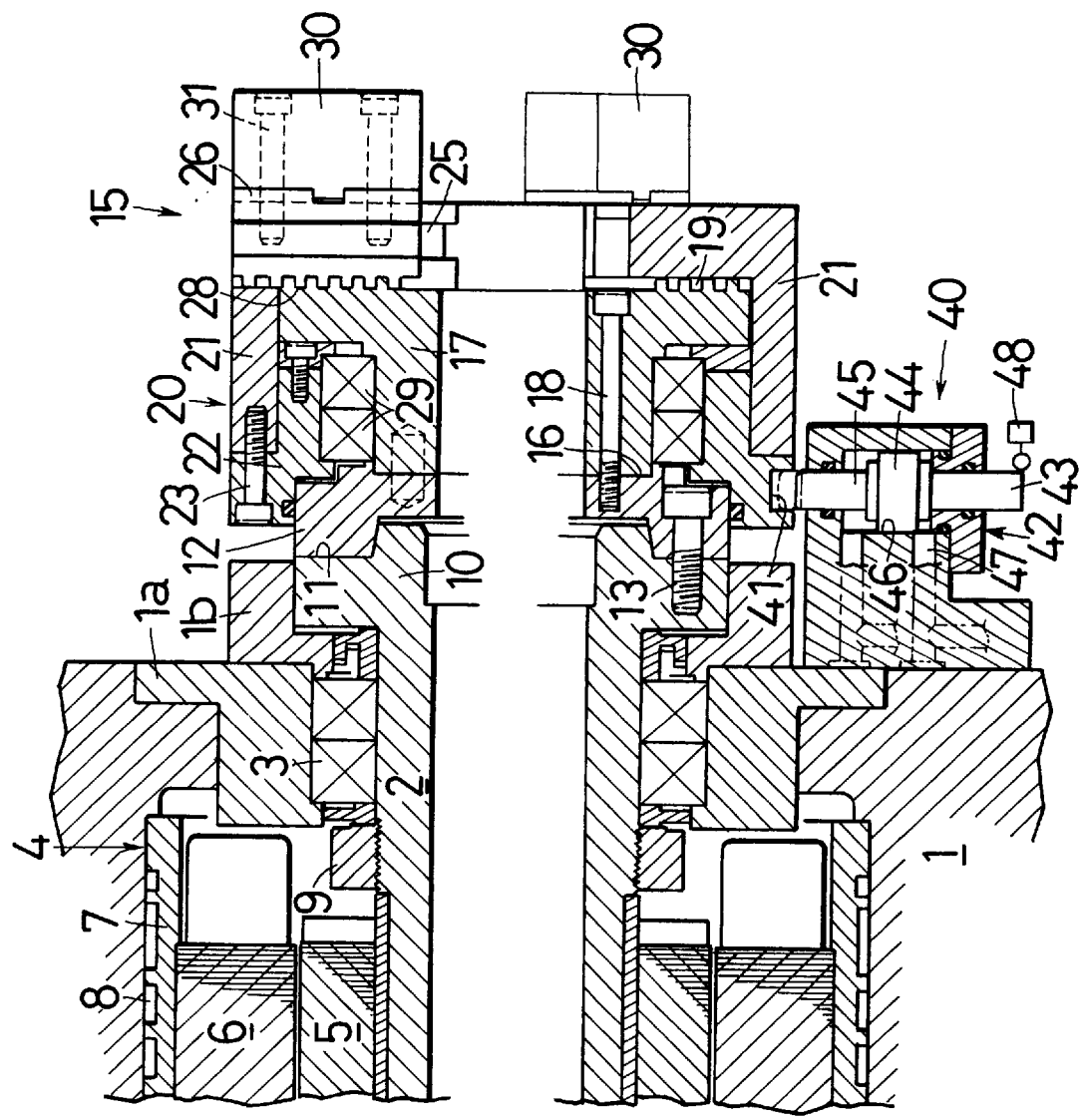
FIG. 1 is a sectional view of a headstock in Embodiment 1, including a numerically controlled lathe according to the present invention.
Figure 2:
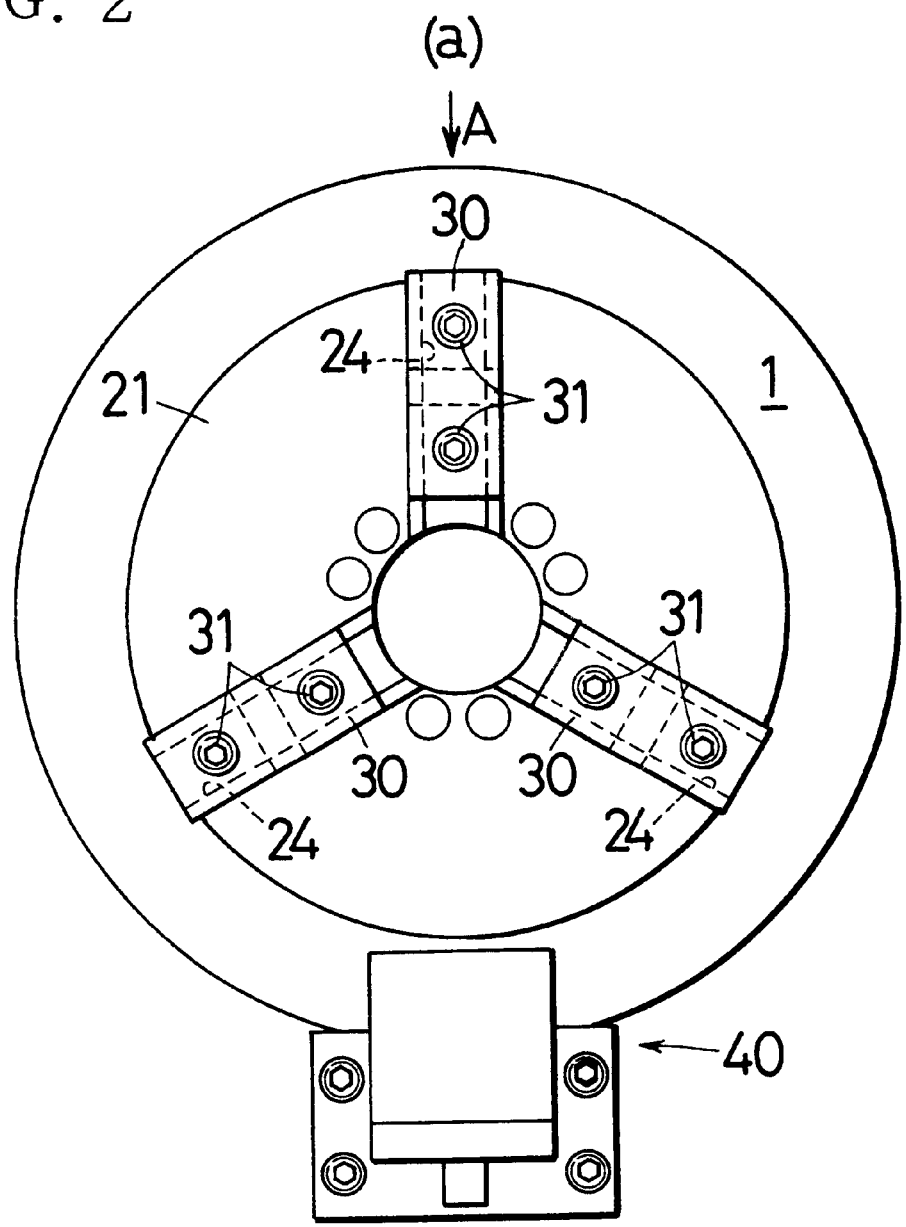
FIG. 2 is a right side view of FIG. 1.
Figure 2:
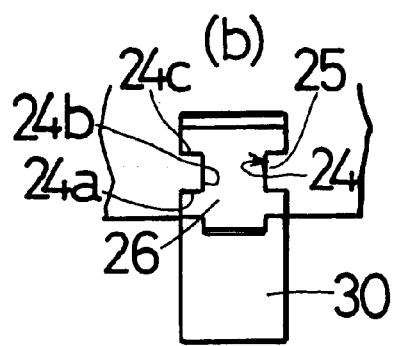

Referring to the drawings, preferable embodiments according to the present invention are described in what follows. FIG. 1 shows Embodiment 1 of an electrically driven chuck of machine tool according to the present invention. FIG. 2($a$) is a right side view of FIG. 1. FIG. 2($b$) is an arrow A side view of FIG. 2($a$). An numerically controlled lathe comprises a headstock 1. An inner bore is formed within headstock 1. A cylindrical bearing retainer 1a is fixed in the inner bore by bolts (not shown). A rolling bearings 3 is inserted onto the inner surface of cylindrical bearing retainer 1a. A main spindle 2 is inserted on the inner surface of rolling bearing 3. As shown in FIG. 1, the inner ring of rolling bearing 3 is fixed with main spindle 2 by a nut 9.

The outer ring of rolling bearing 3 is fixedly inserted onto the inner surface of cylindrical bearing retainer 1a. Main spindle 2 is supported by two rolling bearings 3 on headstock 1. A front cover 1b is fixed by bolts (not shown) on the front surface of cylindrical bearing retainer 1a. The rotor 5 of a built-in-motor 4 is fixed on the outer surface of main spindle 2. A stator 6 is located at the circumferential position of rotor 5.

A coil (not shown) is coiled on stator 6. Stator 6 is fixed with headstock 1.

Stator 6 is inserted into a case 7. A cooling path 8, in which cooling oil flows, is formed on the outer surface of case 7. The cooling oil which flows through the cooling path 8 cools built-in-motor 4 by absorbing the heat generated by built-in-motor 4. The structure and function of built-in-motor 4, which is known, is not detailedly described in the specification. A rotation velocity-and-angle detecting apparatus for detecting the velocity (or the times) of rotation and the position of rotation of main spindle 2, an optical encoder or a magnetic encoder, for example and a main spindle orientation mechanism, including a main spindle orientation sensor for deciding the position of rotation of main spindle 2 at which main spindle 2 is positioned at the orientation position thereof, are provided at the rear end portion of headstock 1 or main spindle 2.

In other words, such built-in-motor 4 rotates main spindle 2 at a predetermined velocity by velocity-controlled feeding-back signals of the rotation velocity-and-rotation angle detecting apparatus, and stops main spindle 2 at voluntarily controlled positions of rotation thereof in order to stop the holding members of a chuck with position-controlled feeding-back signals of the rotation velocity-and-rotation angle detecting apparatus.

Holding members are controlled to move in a stroke along the respective path on which the respective original points have been decided. The original points are respectively set as the upper stroke end or the lower stroke end. Main spindle 2 is stopped at the predetermined position of rotation thereof by making the controlling apparatus execute a command for orientating main spindle 2.

It is later described the orientation mechanism and the control motor. The front portion of main spindle 2 is formed as the main spindle end portion 10, the radius of which is larger than the radius of the other portion of main spindle 2. Main spindle end portion 10 is formed for connecting a plate, a chuck, a center, etc. A circular plate 12 is fixed by bolts 13 on the front surface of main spindle end portion 10. A chuck 15 is mounted on plate 12. Chuck 15 includes scroll 17. Scroll 17 is fixed by bolts 18 on the front surface of plate 12. Scroll groove 19, which is helical in shape, is formed on the front surface of scroll 17. The center line of scroll groove 19 is identical with the center line of main spindle 2. A chuck body 20 is located at the circumferential or peripheral portion of scroll 17. Chuck body 20 includes a first part 21 which is cylindrical, and a second part 22 which is formed like a ring and engages with first part 21. Second part 22 is fixed on the rear surface of first part 21 by bolts 23. As shown in FIG. 2, three master jaw guiding grooves 24 are formed on the front surface of first part 21 at angle intervals which are equal to one another. Master jaw guiding grooves 24 extend in the respective radial directions.

Second part 22 is rotatively supported by two bearings 29 on scroll 17 at the circumferential position. Chuck body 20 is rotatively supported on the circumferential position around scroll 17. As shown in FIG. 2(b), each of master jaw guiding grooves 24 has three guiding surfaces 24a, 24b and 24c. Each of master jaws 26 is slidablely inserted into each of master jaw guiding grooves.

A sliding surface 25 is formed on each of master jaws 26 so that it corresponds to each of guiding surfaces 24a, 24b and 24c which, as a continuous entity, is concavity and convexly formed. A scroll rack 28 (a set of scroll teeth) is formed on the rear surface of each of master jaws 26. A set of jaws 30 which holds a work is fixed with the front surfaces of master jaws 26 by bolts 31. Each of jaws 30 of the set is fixed with the front surface of each master jaws 26 by the bolts. Each of the holding members for holding a work includes each of master jaws 26 and each of jaws 30. Scroll rack 28 of master jaws 26 respectively engage with scroll grooves 19 which are formed on the front surfaces of scroll 17. Thereby, the driving of main spindle 2 without any rotation of chuck body 20 leads scroll 17 to rotate, and master jaws 26 are driven in the respective radial directions, while jaws 30 move so as to hold or detach a work. The holding members of the Embodiment 1 comprise master jaws 26 and jaws 30. However, each of jaws 30 and each of master jaws 26 may be formed in one body.

Chuck Fixing Means 40

Chuck fixing means 40 is a fixing mechanism for fixing chuck body 20 with head stock 1 to prevent rotation of the chuck body 20. A position-deciding hole 41 is formed on the circumferential position of second part 22. Position-deciding hole 41 is formed in the radial direction that is perpendicular to the center line of main spindle 2. A position-deciding-part driving means 42 is located on the circumferential position of chuck 15 and on the front surface of headstock 1. Position deciding-part driving means 42 includes a position-deciding part 43. Position-deciding part 43 has a piston 44.

An inserting portion 45 is formed as the end portion of position-deciding part 43. Inserting portion 45 is inserted into position deciding hole 41. Piston 44 is slidablely inserted into a cylinder 46. Pressured hydraulic fluid such as pressured oil or pressured air is provided within cylinder 46 through a pressured fluid path 47. Piston 44 is driven in cylinder 46. The position at which inserting portion 45 of position-deciding part 43 is inserted into position deciding hole 41 or leaves position deciding hole 41 is detected by a sensor 48 such as a non-contacting switch or a limit-switch.

Operation of Electrically Driven Chuck of Embodiment 1

Operation of the electrically driven chuck of Embodiment 1 is described below. In order for a work to be held by chuck 15, main spindle 2 is stopped at the predetermined angular position by designation of a main spindle orientation system (not shown) operated by an electrically-driven chuck controlling apparatus referred to in FIG. 9. Next, pressured hydraulic fluid is provided within pressured fluid path 47, and air is provided within cylinder 46 so as to drive piston 44. Thereby, inserting portion 45 is inserted into position-deciding hole 41 of chuck body 20. The insertion of inserting portion 45 into position-deciding hole 41 makes chuck body 20 fixed with headstock 1 with the result that the rotation of chuck body 20 is non-rotatively controlled. Under such a non-rotatable condition, built-in-motor 4 is rotatively driven in order for the rotative velocity, number of revolutions and the torque to be so controlled that jaws respectively reach the predetermined holding position. When built-in-motor 4 is rotatably driven, both main spindle 2 and scroll 17 are rotatively driven. When main spindle 2 is driven in the state where chuck body 20 is at rest, master jaws 26 are respectively driven within master jaw guiding grooves 24 of first part 21 in the radial direction where master jaws 26 move towards the center of main spindle 2, and jaws 30 which are respectively fixed with master jaws 26 move to hold a work, while scroll rack 28 of master jaws 26 are engaged with scroll grooves 19 of scroll 17. When built-in-motor 4 is rotated in the reverse direction, master jaws 26 are driven within master jaw guiding grooves 24 of first part 21 in the radially outer direction, while jaws 30 move to free the work from itself.

Embodiment 2

Figure 3:
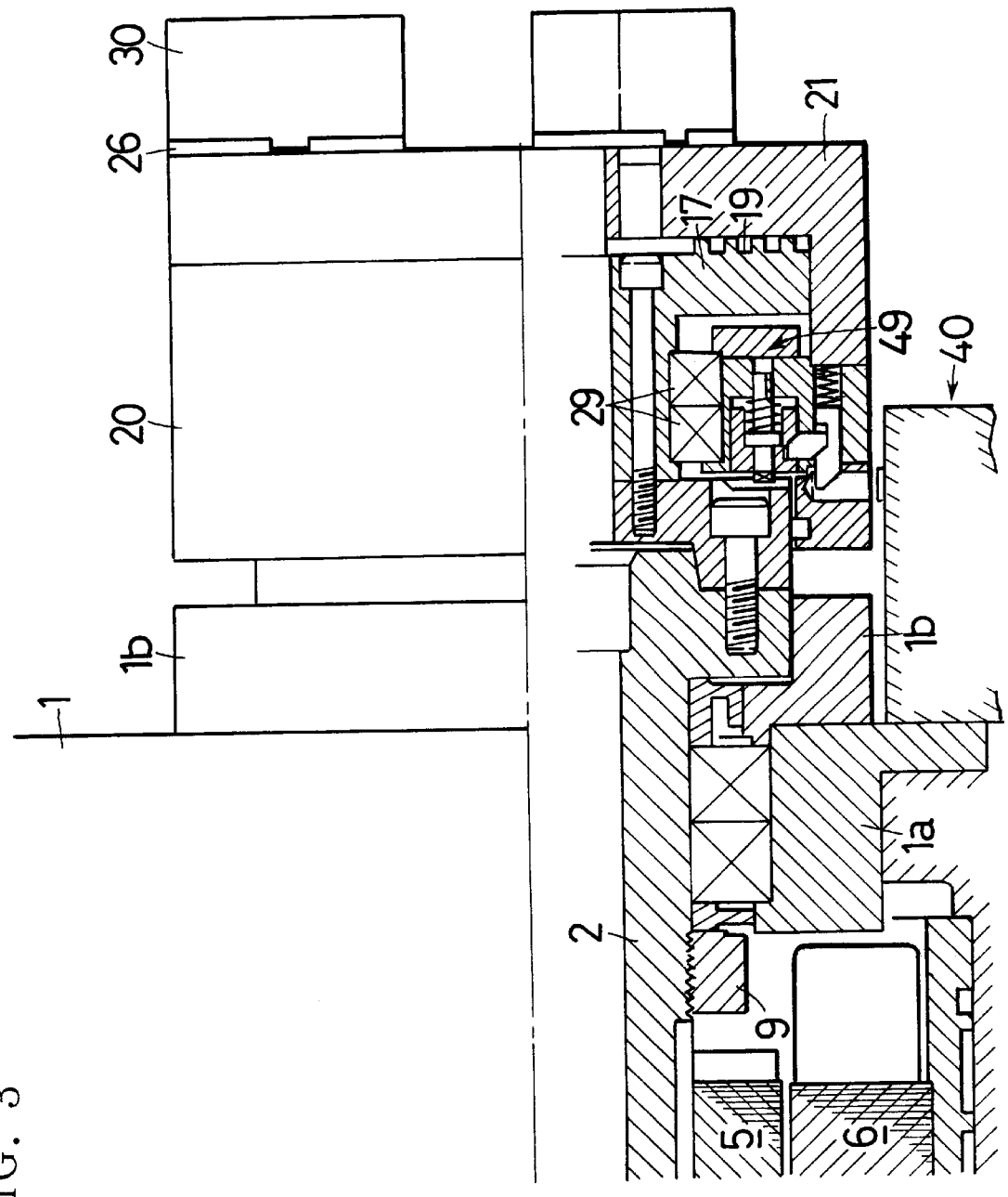
FIG. 3 is a sectional view of a headstock in Embodiment 2, including a numerically controlled lathe according to the present invention.

FIG. 3, FIG. 4(a) and FIG. 4(b) illustrate Embodiment 2. FIG. 3 is a sectional view of a headstock, including an electrically driven chuck of a numerically controlled lathe. FIG. 4(a) is an enlarged view of FIG. 3. FIG. 4(b) is a view of FIG. 4(a) on the A—A sectioning line thereof. An NC-lathe of Embodiment 2 further comprises a locking means 49 so that there is no relative rotation during working between a scroll mechanism and main spindle 2. In the NC-lathe of the Embodiment 1, the cutting torque of main spindle 2 functions in the direction where jaws 30 hold the work when main spindle 2 rotates in the positive direction, and scroll 17 rotates so that the strength of the force for holding the work is not weakened during working.

The scroll chuck of Embodiment 1 holds a work with the friction generated by engagement of scroll groove 19 of scroll 17 with scroll rack 28 of master jaws 26, and without the motion of scroll groove 19 of scroll 17 relative to scroll rack 28 of master jaws 26. If the torque, which functions so that the force generated by the working of cutting between scroll rack 28 and scroll groove 19 is weakened when main spindle 2 is reversely rotated, is larger than the friction, the chucking force is weaker for main spindle 2 and chuck body 20 to rotate relatively to each other with the result being that jaws 30 move. Such a phenomenon occurs in a type of chucking mechanism wherein the jaws hold a work on the inside of the work when the jaws move in the radially outside direction during the positive rotation of the main spindle 2.

Figure 4:
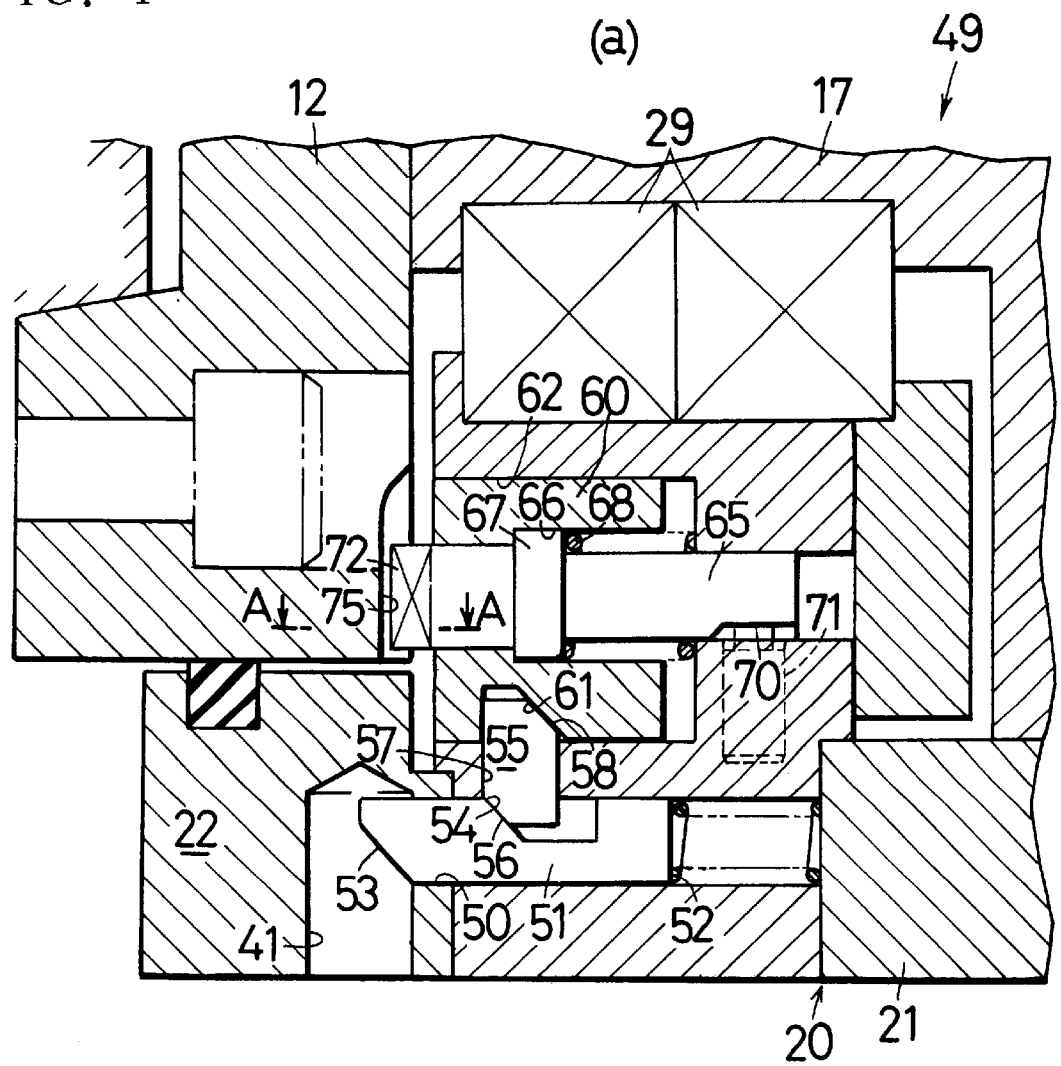
FIG. 4($a$) is an enlarged view of FIG. 3.
Figure 4:
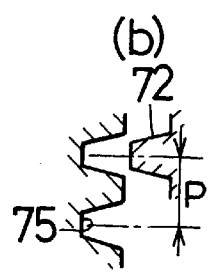

Referring to FIG. 4(*a*) and FIG. 4(*b*), a locking means 49 is explained as follows. FIG. 4(*a*) and FIG. 4(*b*), where the numeral designation of the parts in Embodiment 2 are all the same as the parts designated by the numerals of the Embodiment 1. A first cam sliding hole 50 is formed on the inner peripheral surface of position-deciding hole 41, which is formed on chuck body 20. First cam sliding hole 50 is perpendicular to the center line of position deciding-hole 41.

A pin-like first cam 51 is slidablely inserted into and located on the inside of first cam sliding hole 50. A coil spring 52 is inserted into and located on the front side of first cam sliding hole 50. A first cam surface 53 is formed on the rear side of first cam 51. First cam surface 53 is beveled to be formed at a 45 degree angle against the axis of first cam 51. A second cam surface 54 is formed on the middle of first cam 51. Second cam surface 54 is beveled to be formed at a 45 degree angle against the axis of first cam 51. Second cam surface 54 of first cam 51 engages with third cam surface 56, which is formed on one end portion of a pin-like second cam 55. Second cam 55, which is like a pin, is slidablely inserted into a second cam sliding hole 57. The center line of second cam sliding hole 57 is perpendicular to the center line of first cam 51.

A fourth cam surface 58 is formed on the other end portion of second cam 55. Fourth cam surface 58 is beveled to be formed at a 45 degree angle against the axis of first cam 51. Fourth cam surface 58 engages with a fifth cam surface 61, which is formed as a portion of the outside peripheral surface of a cylinder 60, which is ring-like in the shape, and slidablely inserted into a cylinder sliding hole 62. Three locking-pin sliding holes 66 are formed within cylinder 60. Each of three locking-pin sliding holes 66 has the angle of 120 degrees against each of the other two thereof. FIG. 3, FIG. 4(*a*) and FIG. 4(*b*) respectively illustrate the one of locking-pin sliding holes 66. Three locking pins 65 are respectively inserted into locking-pin sliding holes 66. A piston 67 are formed at the middle portion of each of locking pins 65. Pistons 67 is slidablely inserted into each of locking-pin sliding holes 66. A coil spring 68 is located between the front surface of piston 67 and chuck body 20. Locking pin 65 is biased so that it may always be forced to move in the rear side direction.

A guiding plane 70 is formed as a portion of the peripheral surface of the front portion of locking pin 65. The front portion is formed by cutting. A bolt 71 is fixedly screwed into chuck body 20. Bolt 71 extends in the direction that is perpendicular to guiding plane 70. There is a gap between the top surface of bolt 71 and guiding plane 70.

Locking pin 65 slidablely moves inside locking-pin sliding hole 66 without rotating. An inserting tooth 72 is formed on the rear portion of locking pin 65. Fixing tooth 75 is ring-likely formed on the front portion of circular plate 12, which is fixed with main spindle 2. When inserting tooth 72 is inserted into fixing tooth 75, there is no relative motion between circular plate 12 and chuck body 20, thereby there is no relative rotation between main spindle 2 and chuck body 20, even when main spindle 2 reversely rotates when cutting a work in the opposite direction, and jaws 30 are forced by the torque for cutting in the direction where jaws 30 make the work free therefrom.

Operation of the Electrically Driven Chuck in Embodiment 2

The operation of Embodiment 2 is described below. The work is held by chuck 15 by a set of steps comprising: stopping main spindle 2 at a certain predetermined position of rotation by a main spindle orientation-operative means which is controlled by an orientation-controlling means as described hereinafter, and inserting portion 45 of chuck fixing means 40 into position deciding hole 41 of chuck body 20. Inserting the inserting portion 45 into position-deciding hole 41 makes chuck body 20 fixed to headstock 1 so it does not rotate. A cam surface (not shown) is formed as the top surface of inserting portion 45, the cam surface having an inclination the same as the inclination of first cam surface 53 of first cam 51. The top surface of inserting portion 45 contacts with first cam surface 53 of first cam 51, and pushes first cam 51 against the biasing force of coil spring 52 to move first cam 51 along first cam sliding hole 50.

While first cam 51 moves as such, second cam surface 54 of first cam 51 pushes third cam surface 56 of second cam 55 to move second cam 55 along second cam sliding hole 57 in the direction towards cylinder 60. As shown in the Embodiment 4 described below, referring to FIG. 7(*a*), first cam 51 may be pushed by pressured air which is provided through inserting portion 45. When second cam 55 moves along second cam sliding hole 57, fourth cam surface 58 pushes fifth cam surface 61 of cylinder 60 to move cylinder 60 to the front side direction against the biasing force of coil spring 68. When cylinder 60 moves in the forward direction, the three locking pins 65 of piston 67, which engages with cylinder 60, move in the forward direction, and inserting tooth 72 becomes free from engagement with fixing tooth 75.

The driving of rotation of built-in-motor 4 in such a state of the disengagement rotates main spindle 2 so as to have a predetermined rotative velocity and number of revolution so that jaws 30, which are held controlled in position, reach a radial holding position. The drive for rotation by built-in-motor 4 has both main spindle 2 and scroll 17 simultaneously rotate. Jaws 30 are driven in the same operating manner as the operating manner of Embodiment 1.

Third Embodiment

Figure 5:
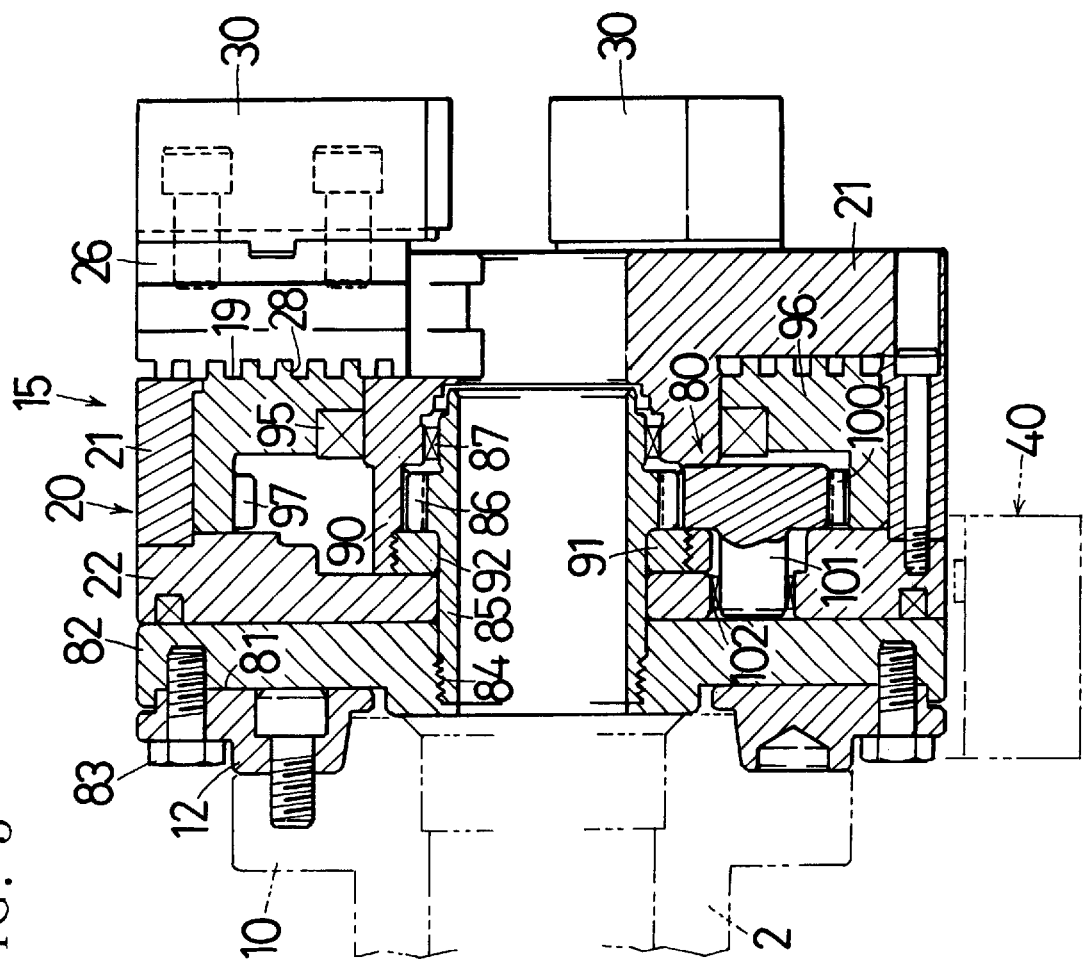
FIG. 5 is a sectional view of a chuck of Embodiment 3 of an electrically driven chuck of a machine tool according to the present invention.
Figure 6:
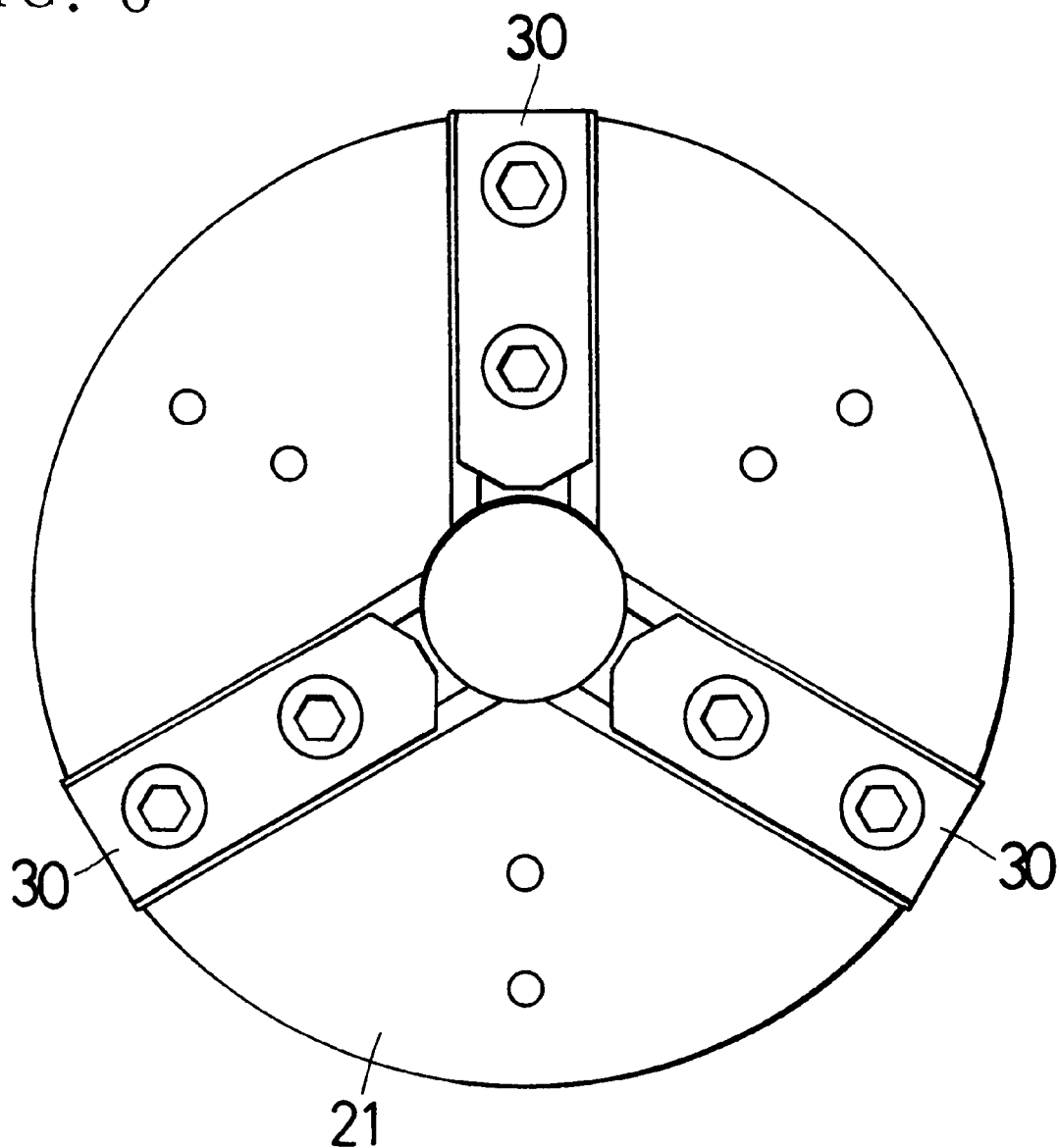
FIG. 6 is a right side view of FIG. 5.

FIGS. 5 and 6 illustrate Embodiment 3. FIG. 5 is a sectional view of a chuck of an electrically driven chuck. FIG. 6 is a side view of FIG. 5. A lathe according to Embodiment 3 include force strengthening means 80, which is provided between a scroll mechanism and main spindle 2. Force strengthening means 80 is equivalent to a gear mechanism for strengthening the holding force by which a work is held by jaws 30.

As described above, if the force generated by the work of cutting between scroll rack 28 and scroll groove 19, the force being weakened when main spindle 2 is reversely rotated, is larger than the friction there between, main spindle 2 rotates in relation .to chuck body 20 with the result that jaws 30 move, and the chucking force for holding a work is occasionally weakened. Force strengthening means 80 is equivalent to a torque strengthening mechanism for strengthening the chucking torque in order to prevent it from weakening. Referring to FIG. 5, where the numeral designation of the parts in the Embodiment 3 are all the same as those parts designated by the numerals of the Embodiment 1, the Embodiment 3 further comprises force strengthening means 80. Force strengthening means 80 includes a driving-gear fixing plate 82, which is fixed by bolts 83 with face plate 12 on the front surface 81 of face plate 12, which in form is fixed with main spindle end portion 10. A female screw 84 is formed on the center hole of driving-gear fixing plate 82. The rear end portion of a cylindrical driving gear body 85 is fixedly screwed into female screw 84. A driving gear 86 is formed on the peripheral portion of driving gear body 85 in order for one end portion of driving gear body 85 to be fixed with main spindle 2.

A cylindrical scroll supporting cylinder 90 (the portion extending out from the rear side direction, this portion and first part 21 being formed in one body) is rotatively supported by a rolling body 87 as a needle bearing on the peripheral portion of driving gear body 85. Female screw is formed on the inner peripheral surface of the rear portion of scroll supporting cylinder 90. A supporting ring 91 is screwed into female screw. The inside hole surface 92 of supporting ring 91 contacts with the outer peripheral surface of driving gear body 85. The rear end portion of scroll supporting cylinder 90 is rotatively supported on driving gear body 85.

A scroll 96 is rotatively supported by a bearing 95 on the peripheral portion of scroll supporting cylinder 90. A scroll groove 19 is helically formed on the front surface of scroll 96. The center line of scroll groove 19 is identical with the center line of main spindle 2. Scroll teeth (rack) 28, which are formed on the rear surface of master jaws 26, engage with scroll groove 19. An inner tooth gear 97 is formed on the inner peripheral portion of scroll 96. Three medium gears 100 respectively and simultaneously engage with driving gear 86 and inner tooth gear 97. The axle 101 of each of medium gears 100 is rotatively supported by a rolling body 102 as a needle bearing on second part 22 of chuck body 20. The gear mechanism, which is equivalent to a kind of reduction gear mechanism, includes driving gear 86, medium gears 100, and inner tooth gear 97.

Operation of the Electrically Driven Chuck of Embodiment 3

The operation of Embodiment 3 is described as follows. In order for main spindle 2 to be stopped at the predetermined angular position by designation of a main spindle orientation system (not shown) operated by a controlling means, and chuck body 20 is fixed with headstock 1. When main spindle 2 is driven to rotate, driving gear 86, which is combined in one body with main spindle 2, is driven to rotate. While driving gear 86 rotates, medium gears 100 spin. Inner tooth gear 97 is driven to rotate, with the velocity of inner tooth gear 97, which engages with medium gears 100, being reduced. The torque of main spindle 2 is strengthened to be larger than the torque for cutting. When inner tooth gear 97 is rotated, scroll 96, which is combined in one body with inner tooth gear 97, is rotated in relation to chuck body 20.

Master jaws 26, which move in the radial direction with respect to the axial line of main spindle 2, move jaws 30 as described in above mentioned Embodiment 1. The electrically driven chuck in Embodiment 3, which has force strengthening means 80, the chucking force is stronger than the chucking force in Embodiment 1, which has no force-strengthening mechanism. Particularly, built-in-motor 4 in the Embodiment 3 wherein it is difficult for a motor having a larger torque to be incorporated because of the restriction of the space where the motor can be located, outputs a larger chucking force to chuck 15, the chucking force being sufficient for machining a work to be cut.

Embodiment 4

Figure 7:
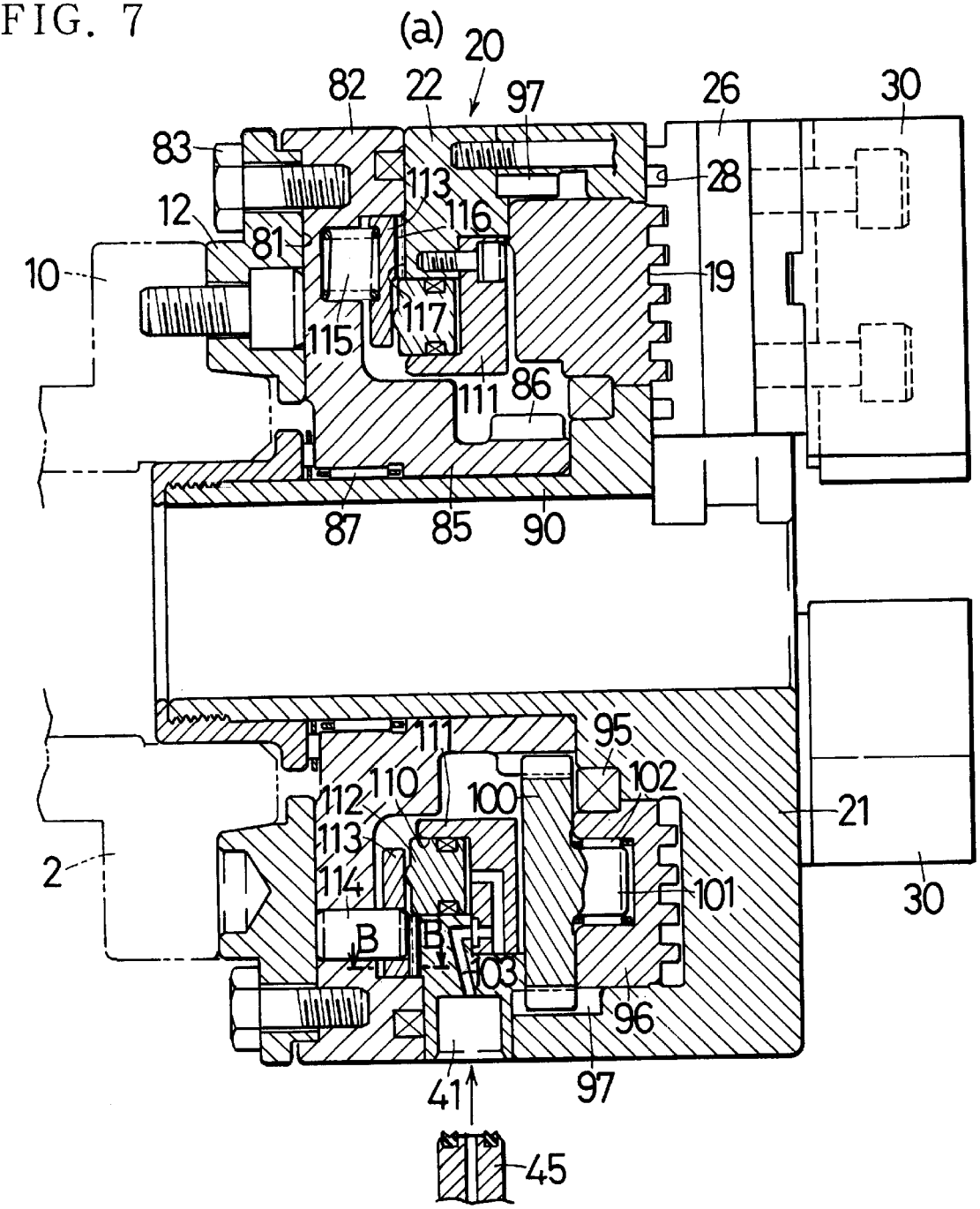
FIG. 7($a$) is a sectional view of a headstock in Embodiment 4, including a numerically controlled lathe according to the present invention.
Figure 7:
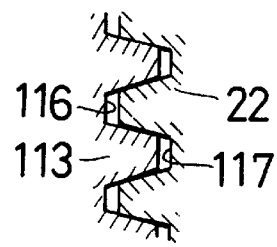

FIG. 7(*a*) is a sectional view of an electrically driven chuck in Embodiment 4. FIG. 7(*b*) is a sectional view of an enlarged view of FIG. 7(*a*) on the B—B sectioning line thereof. The electrically driven chuck according to embodiment 3 includes a reducing gear mechanism for transmitting the motion of rotation to scroll 96 by reducing the velocity of rotation of main spindle 2. A lathe according to Embodiment 4 includes a planet gear mechanism as the velocity reducing gear mechanism, and an air pressuring mechanism for driving the locking mechanism.

The face plate 12 is fixed by bolts on the end portion 10 of main spindle 2. The driving-gear fixing plate 82 is fixed by bolts 83 with the front surface 81 of face plate 12, which is fixed with the end portion 10 of main spindle 2. The cylindrical scroll supporting cylinder 90 is rotatively supported by a rolling body 87 as a needle bearing in the center hole of driving-gear fixing plate 82. Scroll supporting cylinder 90 and first part 21, which extends forward, are formed in one body.

The driving gear 86 is formed on the peripheral portion of driving gear body 85 in order for driving gear body 85 to be fixed with main spindle 2. Scroll 96 is rotatively supported by the bearing 95 on the peripheral portion of the front portion of scroll supporting cylinder 90. Scroll groove 19, which is helical in shape, is formed on the front surface of scroll 96. The center line of scroll groove 19 is identical with the center line of main spindle 2. The scroll teeth 28, which are formed on the rear surface of master jaws 26, engage with scroll groove 19. The inner tooth gear 97 is formed as the inner peripheral portion of the first part 21, which is formed in one body with scroll supporting cylinder 90. The three medium gears 100 respectively engage with both driving gear 86 and inner tooth gear 97. Three medium gears 100 are located at equal angle intervals between driving gear 86 and inner tooth gear 97. The axle 101 of each of medium gears 100 is rotatively supported by a rolling body 102 as a needle bearing on scroll 96. The planet gear mechanism, which is equivalent to the reduction gear mechanism in operation, includes driving gear 86, medium gears 100, and inner tooth gear 97, driving gear 86 being identical with the sun gear which drives other gears, medium gears 100 being identical with the gear which spins and rotates around the sun gear, inner tooth gear 97 being identical with the annular gear which is fixed, and the scroll 96 being identical with the arm which is driven to be rotated.

The position-deciding hole 41 is formed on the second part 22 which is formed in one body with the first part 21. A member which is familiar to and corresponds with position-deciding part 43 of Embodiment 2 in FIG. 1 is inserted into position deciding hole 41. Position-deciding part 43 of Embodiment 4 has an air-supplying port (not shown) which is formed within position-deciding part 43, and through which pressured air is supplied. When position-deciding part 43 is inserted into position deciding hole 41, the pressured air is supplied by opening a valve (not shown).

A ring-like cylinder 111 is fixed with second part 22. A cylinder room 110 which is an annular space is closely formed between second part 22 and cylinder 111. Cylinder room 110 is rectangular in shape on a sectional plane. An annular piston 112 is inserted into cylinder room 110. A cylinder mechanism, which is operated by pressured air, includes cylinder room 110 and annular piston 112.

Pressured air which drives piston 112 is applied into air supply path 103, which is formed by second part 22 and cylinder 111. A clutch plate 113 is located on the rear side of piston 112 so that it contacts with the projection portion of the rear side surface of piston 112. Three guiding pins 114 are fixed within the rear portion of driving-gear fixing plate 82 at respective equal-angle intervals. Clutch plate 113, which is annular, is slidablely mounted on guiding pins 114.

Clutch plate 113 moves backwardly and forwardly. Three coil springs 115 are respectively provided on the back side of clutch plate 113 at respective equal-angle intervals. Piston 112 is moved by a biasing force of coil springs 115 to a forward movement. Clutch tooth 116 are formed on the front side surface of clutch plate 113. The clutch tooth 117 formed on the rear side surface of second part 22, which faces clutch tooth 116. When clutch tooth 116 engage with clutch tooth 117, second part 22 is relatively fixed with main spindle 2 so that second part 22 does not move in relation to main spindle 2.

Operation of the Electrically Driven Chuck of the fourth Embodiment

The operation of the Embodiment 4 is described below. The work is held by chuck 15 by a set of steps comprising: stopping main spindle 2 at a certain predetermined position of rotation with main spindle orientation-operative means, which is controlled by an orientation-controlling means as described hereinafter, and fixing chuck body 20 with headstock 1 by chuck fixing means 40.

Pressured air, which is applied to position deciding hole 41 through the center portion of position-deciding part 43, is further applied to air supply path 103, which is formed on second part 22 and cylinder 111, and drives piston 112. The driven piston 112 forces clutch plate 113 to move backwardly, thereby compressing while coil spring 115. Such motion of clutch plate 113 makes clutch tooth 116, which are engaged with clutch tooth 117, free of clutch tooth 117. Such disengagement makes second part 22 freely rotate in relation to main spindle 2.

As described in the Embodiment 2, piston 112 in the Embodiment 4 may be mechanically driven when inserting portion 45 is inserted into position deciding hole 41. In the state where inner tooth gear 97 is fixed when chuck body 20 is fixed, driving gear 86 which is combined in one body with main spindle 2, is driven if main spindle 2 is driven. If driving gear 86 is driven, medium gears 100 spin and rotate around driving gear 86, and scroll 96 is driven to be rotated with its velocity reduced. Such a velocity-reduced rotation leads to the increase of the torque of main spindle 2.

Main Spindle-angle Detecting Means 110

Figure 8:
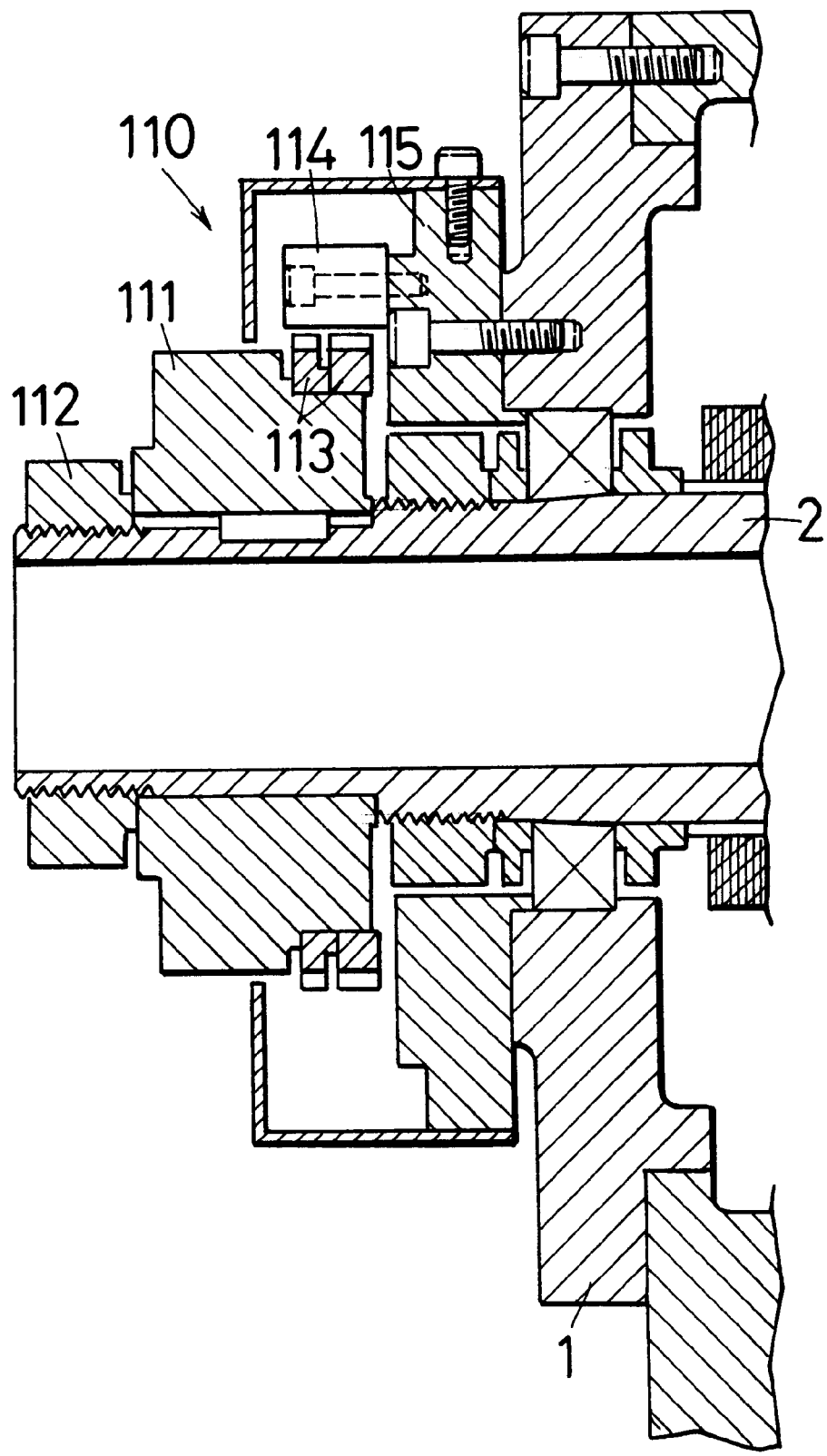
FIG. 8 is a sectional view of a main spindle angle detecting mechanism for detecting the rotation of a main spindle.

FIG. 8 illustrates a main spindle-angle detecting means 110, which includes an encoder for detecting the timing of the rotation of main spindle 2. Main spindle 2 is controlled to be stopped at a desired angle-position in order for main spindle 2 to be fixed at a predetermined, angle position by chuck fixing means 40. For controlling, the rotation of built-in-motor 4, which drives main spindle 2, is controlled corresponding to the angle of rotation of main spindle 2, which is always detected.

A detecting-ring fixing cylinder 111 is non-rotatively fixed with the peripheral portion of the rear portion of main spindle 2. Detecting-ring fixing cylinder 111 is non-rotatively fixed with main spindle 2 through keys, and is axially fixed by means of a fixing nut 112. Two detecting rings 113 are with the peripheral portion of detecting-ring fixing cylinder 111. A concavity and convexly uneven surface is formed on the peripheral surface of detecting rings 113. The concave portion and the convex portion of the concavity and convexly uneven surface are respectively formed at a constant pitch. A detecting sensor fixing ring 115 is fixed with the rear surface of headstock 1 by bolts.

A pulse generator 114 is fixedly located on the rear surface of detecting sensor fixing ring 115 and at the peripheral position of detecting rings 113. When main spindle 2 rotates, and pulse generator 114 detects the times of rotation in order to count the number of the concave portions or convex portions of the peripheral portion of detecting rings 113. It is not described in detail so that these technique is well known by a person skilled in the arts.

Electrically Driven Chuck Controlling Means 120

Figure 9:
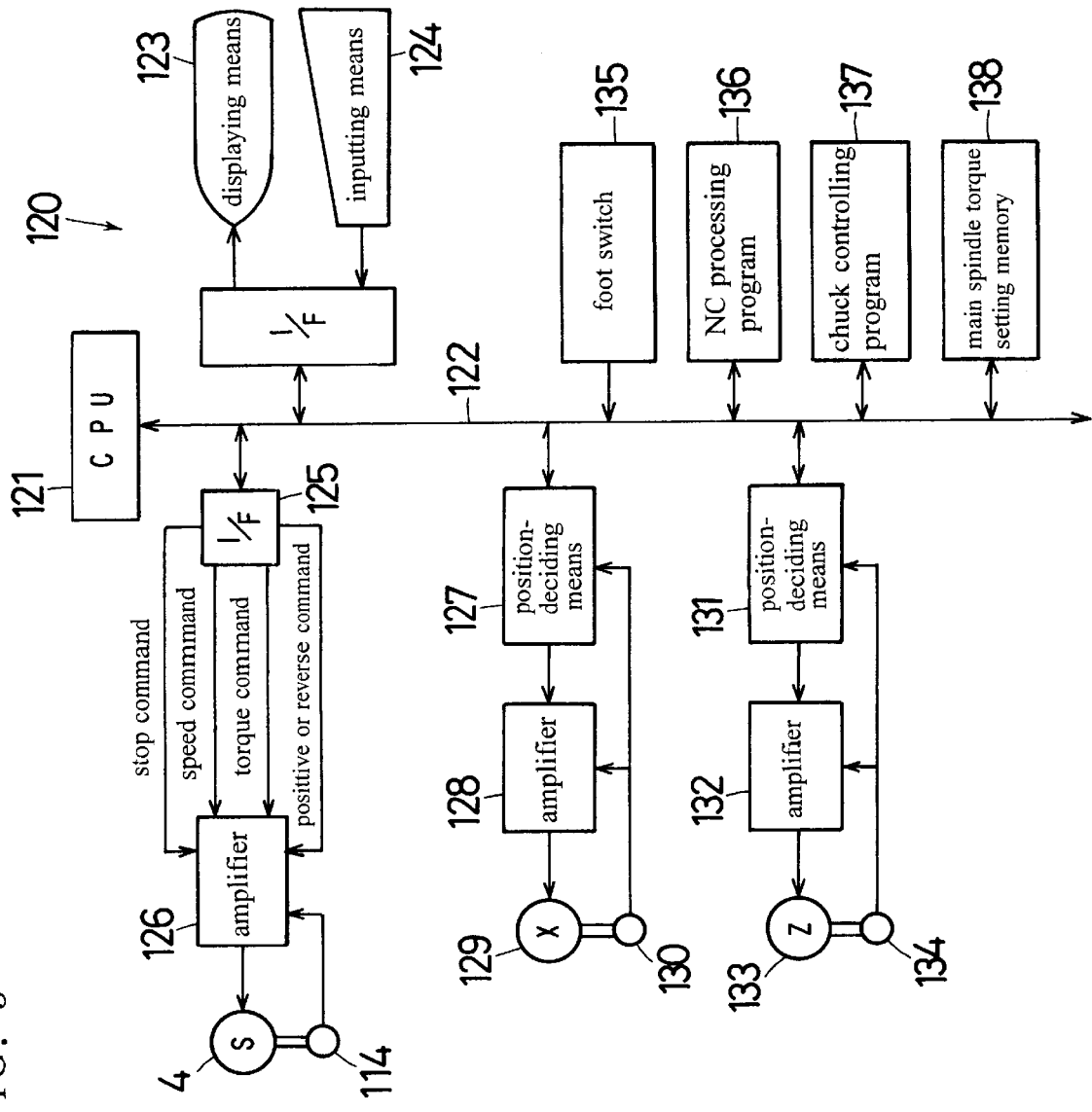
FIG. 9 is a functional block diagram showing a controller of an electrically driven chuck.

FIG. 9 is a functional block diagram showing an electrically driven chuck controlling means 120 included in an NC apparatus and programs. The NC apparatus includes a CPU 121 which treats various kinds of data. An ROM and an RAM (not shown) are connected with CPU 121 through a bus 122. CPU 121 is operated according to the system programs and the data which are memorized in the ROM, and the system programs and the data which are loaded into the RAM.

Displaying means 123 and inputting means 124 for communicating with an operator by means of inputting and outputting information are connected with bus 122 through an interface circuit 125. Displaying means 123 has a CRT or a crystal liquid display. Inputting means 124 has a keyboard or a set of rotatable dials. An NC-machining program s 136 is memorized in the memory area of the RAM. Pulsed instruction signals are sent to an interface circuit 125, a position-deciding means 127 with respect to the X-axis of the tool support, and a position-deciding means 131 with respect to the Z-axis of the tool post according to the NC-machining program 136.

Interface circuit 125, which receives a main spindle rotation command signal, transmits the main spindle rotation command signal to an amplifier 126, and commands built-in-motor 4 to operate. The rotation of built-in-motor 4 is detected by pulse generator 114. The signals of the rotation are fed back to CPU 121 so that the angle of rotation and the velocity of rotation of main spindle 2 is detected. In other words, built-in-motor 4 is equivalent to a motor, wherein the C-axis-rotation around the Z-axis is controlled. Position-deciding means 127, which receives a pulsed command signal, transmits the signal through an amplifier 128 in order to operate an X-axis-driving motor 129.

The rotation of X-axis-driving motor 129 is detected by a pulse generator 130. The signal of the rotation is fed back to position-deciding means 127 so that the position of X-axis-driving motor 129 is controlled. Position-deciding means 131, which receives a command signal from CPU 121, transmits the command signal to Z-axis-driving motor 133 so that position-deciding means 131 commands Z-axis-driving motor 133 to operate. The rotation of Z-axis-driving motor 133 is detected by a pulse generator 134, and the signal of the rotation is fed back to CPU 121 so that the position of Z-axis-driving motor 133 is controlled.

Such processing is carried out by the operation of CPU 121, according to the NC-processing programs. It is not described in detail so that a function of NC-processing programs is well known by a person skilled in the arts. The rotative velocity, the number of revolutions, the torque, the positive or negative direction of the rotation, and the stopping of built-in-motor 4 are respectively controlled by the respective pulsed commands, while the respective driving motors 4, 129, and 133 corresponding with the C, X, Z-axes are moved their respective positions.

Foot switch 135 is a switch for opening and shutting chuck 15 with a foot of an operator. As described below, a chuck controlling program 137 controls the starting or stopping of built-in-motor 4, the operation of chuck fixing means 40, and the holding or letting go of a work by chuck 15 through a programmed processing. As described above, the torque of built-in-motor 4 corresponds to the work-holding force of jaws 30. A main spindle torque setting memory 138 is memory to set the torque of built-in-motor 4, and sets the chucking force of chuck 15:

$$T = K \cdot \alpha.$$

T: torque of built-in-motor, a: holding force of chuck, K: constant The change of the torques of built-in-motor 4 corresponds to the change of the holding force of chuck 15.
Operation of the Electrically Driven Chuck Controlling Means 120

The operation of the NC-lathe according to the Embodiment 1 is described mainly with respect to electrically driven chuck controlling means 120. The method for chucking a work with electrically driven chuck controlling means 120 comprises the set of steps of:

1. transmitting a stop signal to main spindle 2 from CPU 121, when a designated work has been finished according to the NC-processing programs;
2. decreasing the velocity of built-in-motor 4(or so-called main spindle motor) to stop the work at the predetermined angular position with the stop signal, and fixing chuck body 20 with headstock by means of the operation of chuck fixing means 40;
3. change of the position of "the position changing switch" (not shown) of the NC-operating board on the opening side with the operator, and pushing down the foot switch 135 with the foot of the operator after the operator holds the finished work, which is held by chuck 15, with his fingers.
4. reversely driving built-in-motor 4 at a lower velocity in the direction which is opposite from the positive direction where it rotates in order to machine the work;
5. stopping the rotation of main spindle 2 after the predetermined number of revolutions, making chuck 15 let go of the work, and removal of the work from chuck 15 with the operator;
6. making the operator's foot release foot switch 135;
7. inputting a required holding force (Kgf) into main spindle torque setting memory 138 from inputting means 124, and setting main spindle torque setting memory 138 at that torque. (This setting is not necessary when the torque is not changed.);
8. changing the position of "the position changing switch" of the NC-operating board on the closing side with the operator, and pushing down foot switch 135 with the foot of the operator after other new work is inserted with his fingers at the center position of jaws 30;
9. driving the main spindle motor in the positive direction at a lower speed;
10. finishing the holding of the new work, at the chucking force which main spindle torque setting memory 138 sets, by controlling the main spindle motor, wherein the torque of the main spindle motor for holding the work is set so that the torque is weaker than the torque during machining;
11. releasing the operator's foot from foot switch 135;
12. pushing of "the work-starting button" of the NC-operating board with the operator;
13. making chuck body 20 be free of headstock 1 by operation of chuck fixing means 40;
14. machining the work by control with the NC-apparatus.

The controlling of the electrically driven chuck, as described above, is characterized in that an operator manually opens and shuts the chuck. The chuck may be controlled to be opened or shut at controlled torques by the commands of the NC-machining programs, such as M-code or G-code.
Another Embodiments In those embodiments, main spindle 2 is driven by built-in-motor 4. Main spindle 2 may be driven by a main spindle motor through a series of gears or a pulley-belt mechanism. Further, in those embodiments, main spindle 2 is controlled in the position of rotation by built-in-motor 4. Main spindle 2 may be set in the position of rotation by a C-axis motor for exclusive use. Further, in the embodiments, the chuck system is formed as the scroll chuck. The chuck system may be driven by a screw which adjusts the force of rotation of the main spindle to the force of the motion in the axial direction of a draw-bar, wherein the motion of the draw-bar is adjusted to the motion of a work-holding jaws in the radial direction by a lever mechanism or a wedge mechanism. It is not described in detail so that a mechanism of these chucks is well known by a person skilled in the arts.

Further, a set of work holding jaws may be of a type for a collet chuck. Further, in the embodiments, the chuck fixing means is mounted on the headstock. The chuck fixing means may be mounted on the base of the headstock. In such a headstock movable type of machine tool, the chuck fixing means may be mounted on the headstock, or the chuck fixing means may be fixedly mounted on the predetermined portion on the side of the path on which the headstock moves, and the chuck fixing means may operate so as to open or shut the work-holding jaws at the predetermined position.

Availability of the Invention

An electrically driven chuck of a machine tool may be applied or available for a work-holding chuck or a tool-holding chuck of a machining center, or an external cylindrical grinding machine.

What is claimed is:

1. An electrically driven chuck of a machine tool comprising;
    a main spindle, said main spindle being rotatively mounted on a headstock,
    a main spindle motor for driving said main spindle,
    a scroll, said scroll being engaged with said main spindle, wherein a scroll groove is helically formed within said scroll,
    a chuck body, said chuck body being rotatively mounted on the peripheral portion of said scroll,
    holding members, said holding members being mounted on said chuck body, said holding members including the respective scroll teeth which engage with said scroll groove, said holding members being movable in the respective radial directions,
    a chuck fixing means, said chuck fixing means being mounted on a body of said machine tool, said chuck body is relatively fixed with said body in relation to said body, said chuck fixing means engaging or disengaging with said chuck body, said chuck fixing means engaging with said chuck body when said holding members operate to open or close in order to fix the motion of rotation of said chuck body.
2. An electrically driven chuck of a machine tool of claim 1 characterized in that said main spindle motor is built in said main spindle,
    said main spindle motor including a rotor and stator, said rotor being fixed with said main spindle, said stator being fixed with said headstock.
3. An electrically driven chuck of a machine tool of claim 1 characterized in that said chuck fixing means has an engaging hole, said engaging hole being formed on the chuck body of said chuck,
    said chuck fixing means including a position-deciding pin driving means for driving a position deciding pin, said position-deciding pin engaging with said engaging hole and as to simultaneously engage with both said driving gear and said inner gear.

4. An electrically driven chuck of a machine tool of claim 1, 2 or 3 characterized in that said main spindle motor is controlled so that said holding members are controllingly moved to the positions thereof.

5. A method for opening and closing holding members of an electrically driven chuck of a machine tool of claim 1, comprising the following set of steps:

stopping said main spindle by a transmitting channel changing means, rotating said main spindle by said main spindle motor; and moving said holding members in the respective direction in which said holding members are moved to be opened or closed.

6. A method for opening or closing holding members of an electrically driven chuck of a machine tool of claim 1, comprising the following set of steps:

fixing said chuck with said headstock or said machine tool body by said chuck fixing means;

rotating said main spindle with said main spindle motor; and moving said holding members in the respective direction in which said holding members are moved to be opened or closed.

7. A method for opening and closing holding members of an electrically driven chuck of claim 6, characterized in that said engaging or disengaging is identical to a stopping wherein said main spindle is decided to be stopped in a stopping position by an orientation of the main spindle.

8. A method for opening and closing holding members of an electrically driven chuck of claim 5, characterized in that said engaging or disengaging is identical to the stopping wherein said main spindle is decided to be stopped in a stopping position by an orientation of said main spindle.

9. A method for opening and closing holding members of an electrically driven chuck of claim 5 or 6, characterized in that the torque of said main spindle is designated to be greater when said holding members hold a work than the torque when said work is machined.

* * * * *